United States Patent [19]

Hite

[11] Patent Number: 4,596,347

[45] Date of Patent: Jun. 24, 1986

[54] REAR MOUNTED UTILITY BOX WITH A DUMPING PIVOT FOR A LAWN AND GARDEN TRACTOR

[76] Inventor: Francis D. Hite, 2305 Treeline Dr., Easton, Pa. 18042

[21] Appl. No.: 745,702

[22] Filed: Jun. 17, 1985

[51] Int. Cl.$^4$ ............................................... B60R 9/06
[52] U.S. Cl. ............................ 224/42.08; 224/273; 298/17 T
[58] Field of Search ............... 298/1 A, 1 B, 1 R, 5, 298/17 T; 224/42.03 A, 42.08, 42.03 R, 42.44, 273, 42.07, 280, 274

[56] References Cited

U.S. PATENT DOCUMENTS

| | | | |
|---|---|---|---|
| 3,103,290 | 9/1963 | Perri | 224/42.08 X |
| 3,334,761 | 8/1967 | Perri | 224/42.08 X |
| 3,687,344 | 8/1972 | Nixon | 224/273 |

FOREIGN PATENT DOCUMENTS

| | | | |
|---|---|---|---|
| 1131837 | 2/1957 | France | 298/17 T |
| 99265 | 1/1962 | Norway | 298/17 T |
| 862387 | 3/1961 | United Kingdom | 298/17 T |

Primary Examiner—Stephen Marcus
Assistant Examiner—Robert Petrik
Attorney, Agent, or Firm—Ruth Moyerman

[57] ABSTRACT

A rear mounted utility box with a dumping pivot for a lawn and garden tractor is disclosed. A removable housing rests on a horizontal U member of a frame. A vertical plate for attachment of the frame to a yoke is mounted on one of its faces to the U's crossbar. There is a backward extending bracket attached at generally a right angle to the plate's lower edge. A pair of struts, one each spanning from generally the free end of each U member's legs to the bracket supports and stabilizes the frame. A mounting yoke with two arms is attached to the plate's other face at the plate's upper edge. One arm is connected to the tractor's frame generally beneath the tractor's seat, and the other arm serves as a stop for the housing. There is a pivot pin and pivot seat, a lock for releasably locking the housing to the frame, and a stop to limit the pivot. When the lock is released, the housing is free to pivot through the pivot seat until limited by the stop, thereby placing the housing in a dumping mode.

16 Claims, 7 Drawing Figures

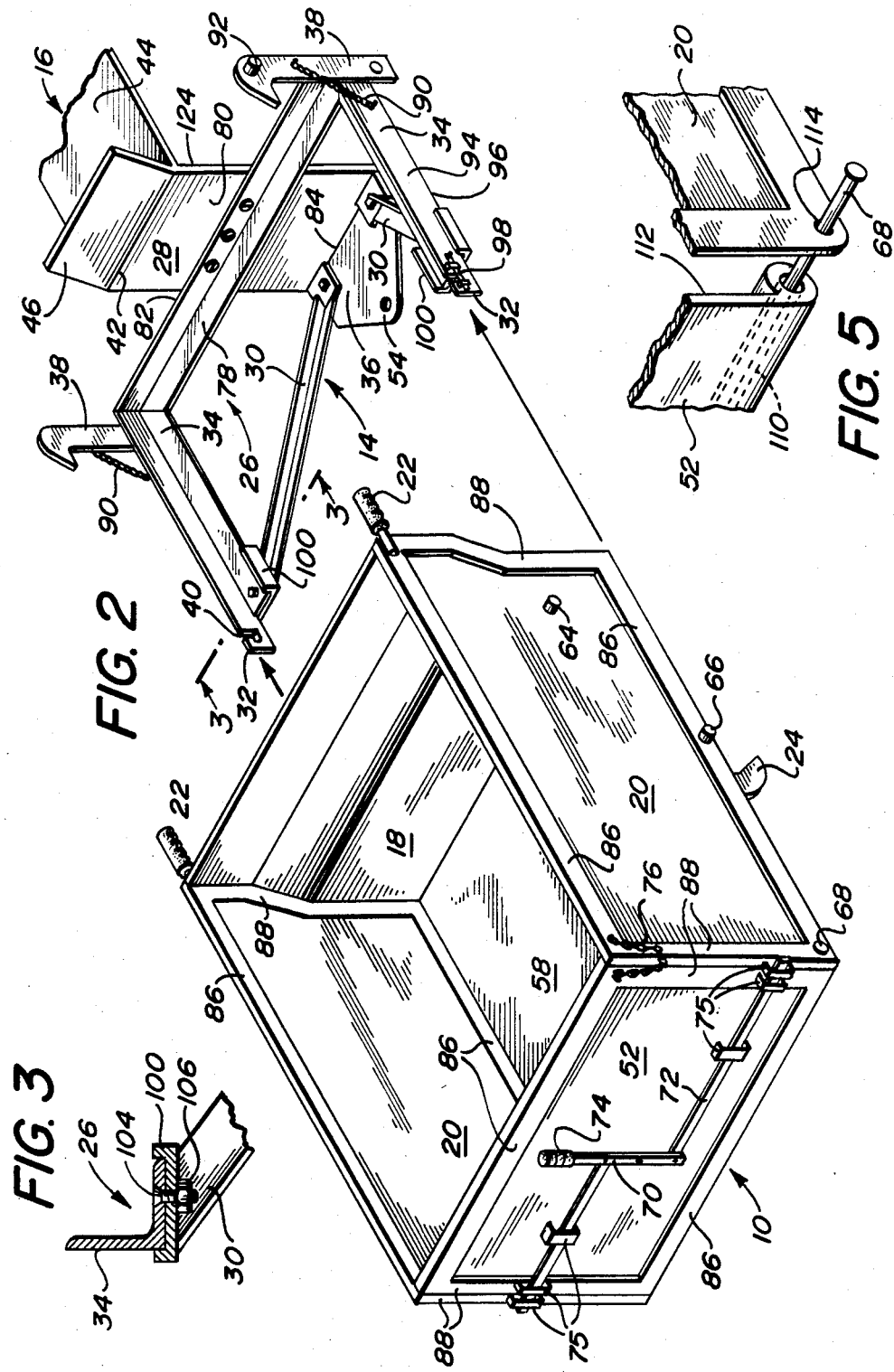

REAR MOUNTED UTILITY BOX WITH A DUMPING PIVOT FOR A LAWN AND GARDEN TRACTOR

BACKGROUND OF THE INVENTION

1. Field of the Invention

This invention relates to receptacles and more particularly to a removable, rear mounted, utility box with a dumping pivot for a lawn and garden tractor.

2. Description of the Prior Art

Many devices are known whose purpose is to function solely as a utility box. There are also several expensive accessories that can be purchased to enhance or expand the use of the smaller, home-type, garden tractor. The aforementioned accessories are usually workably attached to the tractor hitch plate and thereafter pulled by the tractor. One such well known accessory is of the wagon variety.

Certain other boxes or receptacles are known which are attached to the tractor or vehicle itself. U.S. Pat. No. 2,981,554 to Mulder, et al discloses a toolbox-step assembly fitted onto the side of a tractor frame and providing a device accessible to the tractor operator when additional working equipment is mounted directly below and behind the operator's seat. Mulder's assembly includes a toolbox housing including a dependent frame for securing same to the frame of the tractor. The dependent frame and toolbox have mating flanges to retain the toolbox within the frame. A tread plate to cover the toolbox is connected to the dependent frame for swing movement of the tread plate from the covering position to an open position with respect to the toolbox. Mulder intends for his box to be mounted on the side of the tractor frame and be used as a step assembly, giving the tractor's user better access to the seat when auxiliary components are mounted directly below and behind the operator's seat.

U.S. Pat. No. 3,158,302 to Dickerson discloses a luggage carrier removably mounted on the rear of an auto frame. The luggage carrier has a rear portion that is separable from the carrier for use as a loading ramp. Support members of the mounting bracket are secured to the auto frame by pins received through slots in the mounting bracket. The carrier is mounted on the support member by a releasable latching means.

U.S. Pat. No. 2,704,162 to Johnson discloses an attachment for a tractor for engaging underneath a line of pipe for raising same to be disconnected and racking the same. Johnson's attachment is secured to the frame of a tractor and includes (a) a platform forward of the tractor to accommodate a workman, (b) upward brackets extending forward of the tractor and forming racks that include roller means for easy movement of pipes thereon, and (c) upward brackets extending rearward of the tractor and forming additional racks that include roller means for easy movement of pipes thereon. The additional racks receive and store pipe sections after they have been disconnected by the workman on the platform using the first set of brackets.

None of the aforementioned prior art devices perform as a utility box with a dumping pivot mount.

There is, therefore, a great need for a removable rear mounted utility box with a dumping pivot for a lawn and garden type tractor. There is an additional need for the utility box to be cooperatively mounted with the tractor's frame.

SUMMARY OF THE DISCLOSURE

The aforementioned prior art problems are overcome by the removable, rear mounted utility box with a dumping pivot of this invention.

The invention is adapted for use primarily on a lawn and garden tractor. In the preferred embodiment, the removable housing has an irregular-shaped front wall to conform to a tractor's rear outline. The side and back walls are generally vertical, and there is a generally horizontal bottom wall. A frame with a backward facing, horizontal U member receives the housing. A plate for attachment of the frame to a yoke is mounted vertically on one of its faces to the horizontal U member's crossbar's exterior side. A backward extending bracket is attached at generally a right angle to the plate's lower edge. A pair of struts, one each spanning from generally the free end of each U member's legs to the bracket, supports and stabilizes the frame.

A generally V-shaped mounting yoke is adapted to be attached to the plate's other face at the plate's upper edge. The yoke's one arm is adapted to be attached to a tractor's frame at that portion of the tractor's frame located generally beneath the tractor's seat. The yoke's other arm extends in a predetermined slant to correspond with the housing's offset, thereby serving as a stop for the housing.

A means to pivot the housing, a means to releasably lock the housing to the frame, and a stop means to limit the pivot are optionally included in this invention.

When the locking means is released, the housing is free to pivot through the pivot means until limited by the stop means and is thereby placed in a dumping mode.

It is, therefore, an object of this invention to provide a receptacle or utility box that is easily removable and for which the frame can be used for other accessories.

It is also an object of this invention to provide a utility box with a dumping pivot to replace work previously done with a wheelbarrow.

It is still another object of this invention to provide a utility box with a dumping pivot that does not require the use of an additional power unit.

It is a further object of this invention to provide a utility box whose user can activate the dumping action by standing to either side of the box and thereby remain safe from the fall of the load.

It is still a further object of this invention to provide a utility box supported by its own frame so that the tractor's trailer hitch is simultaneously available to pull another piece of equipment.

These and other objects will be more readily ascertainable to one skilled in the art by reference to the accompanying drawing and exemplary embodiments that follow.

BRIEF DESCRIPTION OF THE DRAWING(S)

FIG. 2 is an exploded view of the device of this invention showing the housing and frame, and a partial of the mounting yoke.

FIG. 3 is a partial cross section taken along lines 3—3 of FIG. 2 showing the innerfacing angle irons and underlying U channel bracket with recessed nut and bolt.

FIG. 5 is an exploded fragmentary enlargement of the housing showing the pin and socket of the side and back wall.

DETAILED DESCRIPTION OF THE PREFERRED EMBODIMENT(S)

Figure 1:
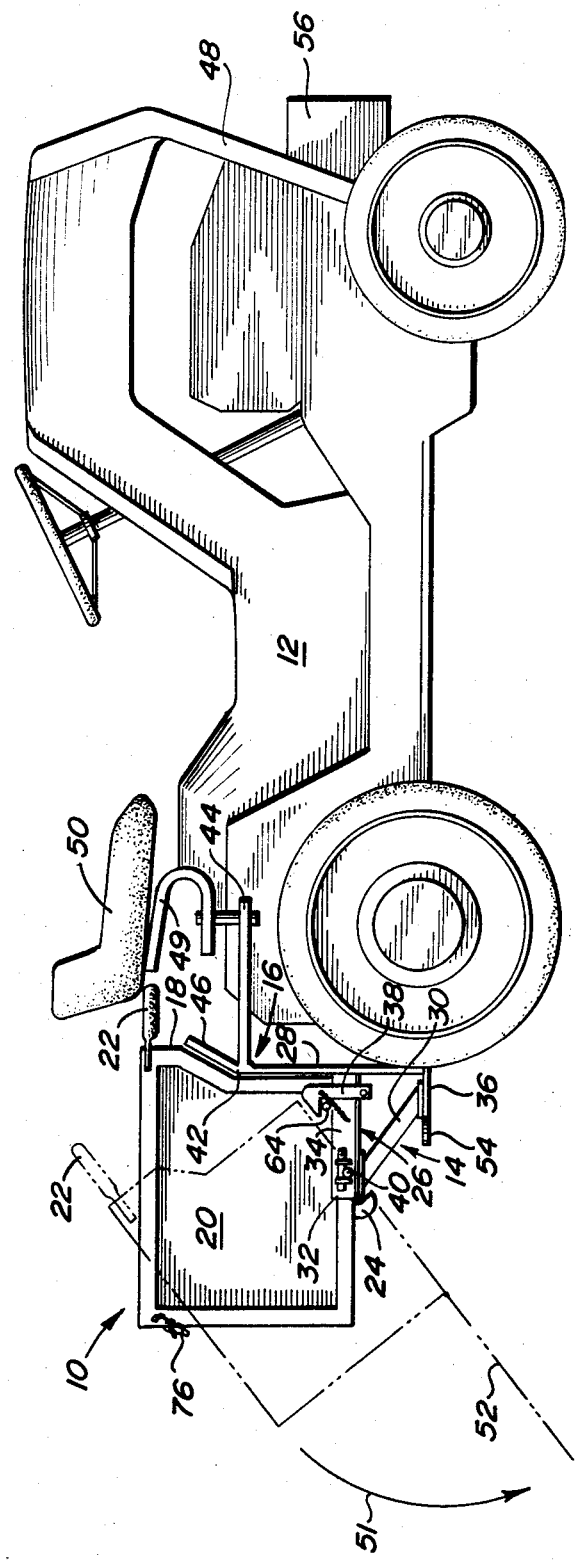
FIG. 1 is a side view of the device of this invention showing the utility box mounted on the tractor and the box in a dumping mode in phantom.

Referring now to the drawings and more particularly to FIG. 1, a side view of the preferred embodiment of this invention is shown including a phantom view of housing 10 in a dumping mode. Housing 10 is mounted on tractor 12. FIG. 2 shows the same embodiment of the apparatus in an exploded view of housing 10, frame 14 and a partial of yoke 16.

With reference to these two Figures together, housing 10 includes offset wall 18 which conforms generally to tractor 12's rear outline. Offset front wall 18 dog-legs in an off-set vertical rise approximately one-half of the height of front wall 18, thereafter extending in an upward, forward slant approximately the second one-fourth of the height of front wall 18 and still thereafter extending vertically upward for the final approximately one-fourth of the height of front wall 18.

Housing 10 also includes vertical side walls 20, vertical back wall 52 and horizontal bottom wall 58. Front wall 18, side walls 20 and back wall 52 each include lateral reinforcing supports 86 and longitudinal reinforcing supports 88 along the perimeter of housing 10 as illustrated.

Side walls 20 include handles 22 to aid in lifting housing 10 into a dumping mode as shown in phantom. Each side wall 20 includes a latch pin 64 for locking housing 10 to frame 14, a pivot pin 66 for pivoting housing 10, and a stop 24 for limiting the pivot of housing 10. In the phantom view, back wall 52 has been lowered in the direction of arrow 51.

Socket pin 68, mounted on the lower rear of side wall 20, serves as the pin within a socket that holds rear wall 52 to side walls 20. This arrangement is more clearly shown with reference to FIG. 5.

Double pivot slide bar 70 is workably connected to side walls 20 by double pivot slide bar 72 and handle 74. Slide bar 72 holds back wall 52 closed by slide bar 72's containment within brackets 75.

Chain 76 is attached at its ends to side wall 20 and back wall 52. The function of chain 76 will be discussed in reference to FIG. 6.

Frame 14 includes horizontal U member 26 which receives housing 10. Horizontal U member 26 includes innerfacing angle iron legs 34 extending backward of innerfacing angle iron crossbar 78. Frame 14 also includes plate 28 for attaching frame 14 to yoke 16 through recessed bolts 126. Plate 28 is vertically mounted on its face 80 to exterior side 82 of crossbar 78. Backward extending bracket 36 is attached at generally a right angle to plate 28 at its lower edge 84 as seen in FIGS. 1 and 2.

Hitch plate 54, an extension of bracket 36, remains exposed and may be used at the same time housing 10 is in use or mounted on tractor 12.

A pair of struts 30, one each spanning from generally just short of each free end 32 of legs 34 of U member 26 to bracket 36 to support and stabilize frame 14.

Each rearward facing spring latch 38 is held in locking position by spring 90. Each latch 38 includes an outer pinned handle grip 92 to aid in the release of latch 38. Latches 38 are pivotally mounted to each other by a connecting rod (more clearly shown in FIG. 7) underneath crossbar 78 so that when one latch 38 is released, the other will follow.

Pivot seat 40 is attached to each exterior side 94 of leg 34 proximate the free end 32 of leg 34, although only one is visible in this view.

Horizontal U member 26 is shown as having innerfacing angle irons. Leg ends 32 of legs 34 are further supported by underlying U channel brackets 100. This structure is more clearly shown in FIG. 3. Horizontal U member 26, with its innerfacing angle irons, has a greater inside diameter than housing 10's outside diameter, so that housing 10 is contained within and rests on horizontal U member 26.

When housing 10 is fitted into frame 14, latch pins 64 of housing 10 and spring latches 38 of frame 14 will be workably aligned as well as pivot pins 66 of housing 10 and pivot seats 40 of frame 14. Therefore, when latches 38 of frame 14 are released from latch pins 64 of housing 10, housing 10 is free to pivot around pivot pins 66 of housing 10 through pivot seats 40 of frame 14 until such pivot is limited by stop blocks 24 of housing 10 coming in contact with underside 96 of legs 34. Housing 10 may be removed from frame 10 by unlatching latches 38 and unlocking pivot seats 40's cooperating bolt 98. The pivot seat 40 and cooperating bolt 98 are more clearly shown in FIG. 4.

Yoke 16 (shown only partially in FIG. 2) is adapted to be attached to other face 124 of plate 28 at upper edge 42 of plate 28. Arm 44 of yoke 16 is adapted to be attached by nuts and bolts to rear frame 49 of tractor 12 at that portion located generally beneath tractor seat 50, shown in FIG. 1. Other arm 46 of yoke 16 extends in a predetermined slant to correspond with offset front wall 18 of housing 10, thereby serving as a stop for housing 10 when it is placed on frame 14.

Also shown in FIG. 1 is optional counterweight 56 which has been attached to front frame 48 of tractor 12 to counterbalance the weight of any heavy load which might be placed in housing 10.

Referring now to FIG. 3, a partial cross section taken along lines 3—3 of FIG. 2 is shown. Leg end 32 of innerfacing angle iron legs 34 of horizontal U member 26 are further supported by underlying U channel bracket 100 and are joined together by recessed flat head bolt 104 and hex nut 106.

Figure 4:
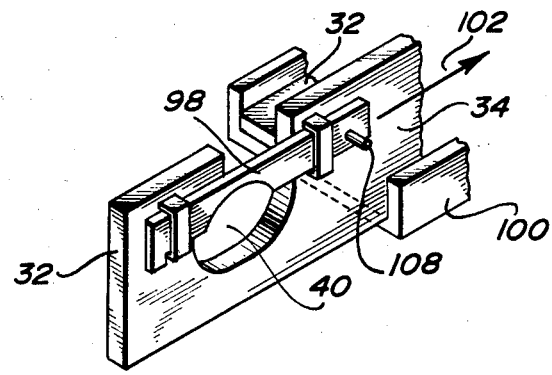
FIG. 4 is a fragmentary enlargement of the leg showing the pivot seat and cooperating bolt.

Referring now to FIG. 4, a fragmentary enlargement of leg 34 with pivot seat 40 and cooperating bolt 98 is shown. Pivot seat 40 is located on leg 34 of the horizontal U member proximate its free end 32 so that the housing (not shown in this view) will pivot free of the struts (not shown in this view). By depressing cooperating bolt 98 and pulling it to the side in the direction of arrow 102 by use of handle 108, the pivot pin of the housing (not shown in this view) is no longer restricted and the housing may be lifted clear of bolt 98, facilitating removal of the housing from the frame only after the latch (not shown) has become unlatched.

Referring now to FIG. 5, an exploded fragmentary enlargement of the housing with pin 68 and socket 110 is shown. Socket 110 (partially in phantom) spans the width of interior 112 of back wall 52. Pin 68 is inserted into socket 110 by aperture 114 of side wall 20 and spans the width of back wall 52 until it reaches through another aligned aperture in the other side wall and is held in place by a snap ring. The other aperture, side wall and snap ring are not shown in this fragmentary view, but operate cooperatively as previously explained.

Figure 6:
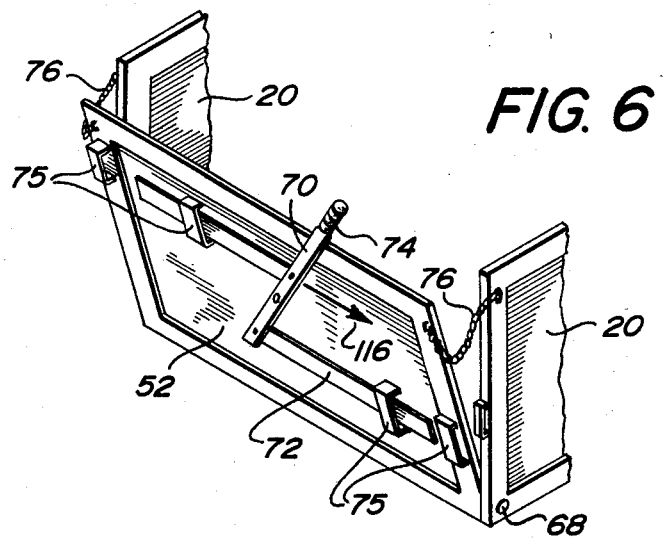
FIG. 6 is a partial view of the housing showing the back wall open.

Referring now to FIG. 6, a partial view of the housing with open back wall 52 is shown. Back wall 52 has been released from side walls 20 by the movement of handle 74 in the direction of arrow 116. Thus, pivot bar 72 is free of brackets 75 and back wall 52 is free to rotate around pin 68 until back wall 52 is restricted by chains 76. Chains 76 are of a predetermined length to hold back wall 52 in a slant.

Figure 7:
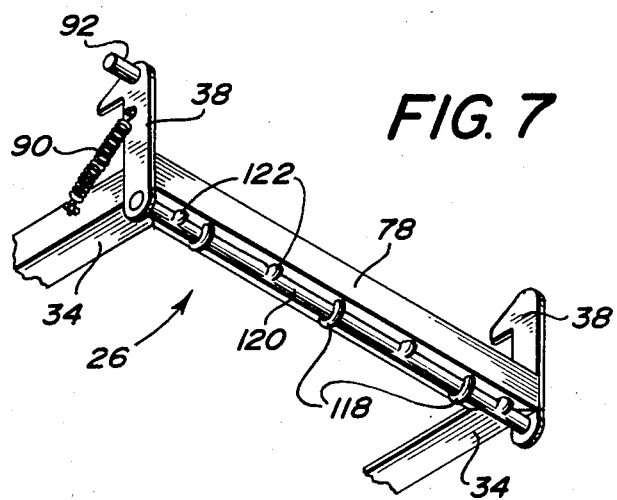
FIG. 7 is a partial bottom view of the latch assembly showing, eyelets holding the latch connecting rod to the frame.

Referring now to FIG. 7, a partial bottom view of the latch assembly is shown. Latches 38 are pivotally connected to each other by rod 120. Rod 120 is workably connected to crossbar 78 of horizontal U member 26 by eyelets 118. Stops 122 (facing in the direction of a tractor) are stamped into rod 120 to prevent spring 90 from pulling latch 38 too far forward when the housing (not shown) is in a dumping mode.

There are many variations which may be practiced within the scope of this invention. While it has been illustrated and is preferred that the housing's front wall have an offset to conform to the tractor's rear outline, it is merely preferred as it allows for more space in the housing and is not critical to the invention.

While it has been illustrated and is preferred that the housing rear wall may be released and lowered, such movement is not required.

While the overall shape of the housing has been illustrated, it is by no means meant to be limiting as the housing may be of any size and shape so long as the intended purpose does not change.

While the back door is illustrated to be hinged at the bottom and opening at the top, the order can be reversed or switched from side to side and still be within the scope of this invention. The back door may also be lifted through channel means and still be within the scope of the invention.

While the means for releasably locking the housing to the frame, the means to pivot the housing, the means to limit the pivot, and the means to attach a counterbalance are all illustrated and preferred, any of these means may be adjusted or changed and still be within the scope of this invention so long as the intended purpose is carried out.

While the frame and yoke configuration are described and illustrated, it is by no means meant to be limiting and these configurations may be adjusted or changed and still be within the scope of this invention so long as the intended purpose of supporting the housing has not changed.

Handle means are illustrated as an aid in putting the box in the dumping mode, but they are not critical to this invention.

While lateral and longitudinal supports along the perimeter of the housing are illustrated, they are merely preferred for reinforcing the box and are not critical.

While the housing is illustrated to have an unobstructed interior, the interior could be compartmentalized and still be within the scope of this invention.

A counterbalance is illustrated attached to the tractor's front frame, this is merely preferred and necessary only in the instance where the utility box is filled with a heavy load.

While the rear wall is illustrated to include a latch for opening, any means could be employed and still be within the scope of this invention.

Lastly, while a pin and socket is illustrated as the means to removably attach the back wall to the side walls, it is merely suggested and any method could be used and still be within the scope of this invention.

The device of this invention has many advantages. Chiefly among these is that the utility box is removable and the frame can receive other accessories such as a grass catcher and fertilizer hopper.

Second, the device of this invention does not require connection to a power driven unit.

Third, the device of this invention serves both as a load carrying unit and a mechanical wheelbarrow.

Fourth, the device of this invention sits on its own frame and does not utilize the trailer hitch plate, thereby leaving the trailer hitch simultaneously available to engage other equipment.

Lastly, the device of this invention is put into a dumping mode by the user standing at the side, thereby protecting him from the fall of the load.

Having now illustrated and described my invention, it is not intended that such description limit the invention, but that the invention be limited only by a reasonable interpretation of the appended claims.

What is claimed is:

1. A rear mounted utility box with a dumping pivot for a lawn and garden tractor comprising:
   (a) a removable housing having a front wall adapted to conform generally to a tractor's rear outline, two generally vertical side walls, a generally vertical back wall and a generally horizontal bottom wall;
   (b) a frame including a horizontal U member to receive said housing, said U member's legs extending backward of said U member's crossbar; a plate for attachment of said frame to a yoke, said plate mounted vertically on one of it's faces to said crossbar's exterior side; a backward extending bracket attached at generally a right angle to said plate at said plate's lower edge, said bracket extending in a plane parallel to and below said U member; a pair of struts, one each spanning from generally the free end of each said U member's legs to said bracket to support and stabilize said frame;
   (c) a generally V-shaped mounting yoke adapted to be attached to said plate's other face at said plate's upper edge, said yoke's one arm adapted to be attached to a tractor's frame at that portion of said tractor's frame located generally beneath said tractor's seat, said yoke's other arm extending in a predetermined slant to correspond with said housing's offset, thereby serving as a stop for said housing;
   (d) means to pivot said housing;
   (e) means to releasably lock said housing to said frame;
   (f) stop means to limit said pivot,
   whereby when said locking means is released, said housing is free to pivot through said pivot means until limited by said stop means, thereby placing said housing in a dumping mode.

2. The utility box according to claim 1 wherein said housing's irregular shaped front wall dog legs in a rise vertically at generally a right angle to said horizontal bottom wall approximately one-half of said front wall's height, thereafter extending in an upward forward slant approximately the second one-fourth of said front wall's height and still thereafter extending vertically upward for the final approximately one-fourth of said front wall's height.

3. The utility box according to claim 1 wherein said back wall of said housing is removably attached to each of said side walls.

4. The utility box according to claim 3 wherein said removable attachment of said back wall to said side walls is by pin and socket.

5. The utility box according to claim 1 wherein said back wall includes a latch workably connected to each said side wall.

6. The utility box according to claim 5 wherein said latch is a double pivot slide bar.

7. The utility box according to claim 1 wherein said side walls of said housing include handle means.

8. The utility box according to claim 1 wherein at least one of said side walls is connected to said back wall of said housing by flexible chain of a predetermined length so that when said back door is opened, said chain serves as a stop means to hold said door.

9. The utility box according to claim 1 wherein said housing wall edges include lateral and longitudinal reinforcing supports along the perimeter of said housing.

10. The utility box according to claim 1 wherein said U member of said frame is an innerfacing angle iron, said angle iron having a greater inside diameter than said housing's outside diameter so that said housing is contained within and rests on said angle iron.

11. The innerfacing angle irons according to claim 10 wherein said angle irons are further supported by underlying U channels.

12. The utility box according to claim 1 wherein said means to pivot said housing includes at least two pivot pin seats and cooperating bolts, each said seat and said bolt mounted on each said leg of said frame at each of said leg's outer side proximate said leg's free end; each said pivot seat being aligned with an outward projecting pivot pin on each said housing side wall proximate its rear of center above the intersection of each said side wall with said bottom wall, said legs of said frame of a length predetermined so that said box pivots free of said struts.

13. The utility box according to claim 1 wherein said means to releasably lock said housing to said frame includes two workably connected, rearward facing spring latches, each said latch pivotally mounted to the other by a rod connected to said frame proximately underneath said crossbar; each said latch aligned with an outward projecting locking pin on each said side wall of said housing generally above the intersection of each said side wall with said front wall and said bottom wall.

14. The spring latch according to claim 13 wherein each said latch includes an outer pinned hand grip.

15. The utility box accorrding to claim 1 wherein said stop means to limit said pivot includes two blocks, each said block located respectively on the underside of each said side wall.

16. The utility box according to claim 1 including, additionally, means adapted to attach to the front of said tractor's frame to counterbalance the weight of a load in said housing.

* * * * *